Oct. 28, 1969 G. A. CAMPBELL 3,475,619

ELECTRICAL CODED-PULSE GENERATOR FOR MARINE SIGNALS

Filed Sept. 29, 1967 2 Sheets-Sheet 1

INVENTOR
GEORGE A. CAMPBELL
BY
John A. Harvey
ATTORNEY

Oct. 28, 1969 G. A. CAMPBELL 3,475,619

ELECTRICAL CODED-PULSE GENERATOR FOR MARINE SIGNALS

Filed Sept. 29, 1967 2 Sheets-Sheet 2

INVENTOR.
GEORGE A. CAMPBELL
BY
John A. Harvey
ATTORNEY

United States Patent Office 3,475,619
Patented Oct. 28, 1969

3,475,619
ELECTRICAL CODED-PULSE GENERATOR FOR MARINE SIGNALS

George A. Campbell, Pompton Plains, N.J., assignor to Pennwalt Corporation, a corporation of Pennsylvania Filed Sept. 29, 1967, Ser. No. 671,863
Int. Cl. H02j 3/14
U.S. Cl. 307—40 21 Claims

ABSTRACT OF THE DISCLOSURE

Energization of marine and the like navigational flashing lights and of acoustical warning devices such as fog horns is accomplished in repetitive code patterns each made up of energization intervals selectively having equal or unequal durations and of intervening deenergization intervals also selectably having equal or unequal durations. The code pattern repetition rate is established by a time-interval signal generator which periodically initiates each energization-deenergization code pattern subject to overriding but abruptly exerted control by an ambient light sensing device according to the prevailing ambient light intensity below or above a preselectable value unaffected by flashing light intensities or durations. The duration of each energization interval and of each deenergization interval in the code pattern is preselectable, independently of any other such interval, by independent electrical timing structures successively selected for timing control by a successive interval counter. The latter additionally controls either the energization or both the energization and deenergization of the navigational devices according to the preselected energization-deenergization code pattern.

The present invention relates to electrical coded-pulse generators for marine signals and, more particularly, to such generators especially suited for successive energization and deenerigzation of navigational flashing lights and acoustical warning devices according to preselected code patterns repeated at a convenient preselected pattern interval.

It is an object of the invention to provide a new and improved electrical coded-pulse generator of simple and relatively inexpensive construction yet one exhibiting high operational reliability and efficiency.

It is a further object of the invention to provide a novel electrical coded-pulse generator providing any desired random sequence of accurately and stably timed code pulse and interpulse intervals, and one permitting very flexible and easily and readily effected selection and change of the sequency of occurrence of code pulses having individual differing pulse lengths and of the value not only of each pulse and each interpulse time interval but in addition of the ratio of any given pair of successive pulse and interpulse intervals.

It is an additional object of the invention to provide an improved electrical coded-pulse generator particularly suitable for marine navigational flashing light control by reason of its characteristic long life, its need for little or no service attention, the minimized power required for its operation, its relative operational independence of an undesirably poor regulation characteristic of the power supply source, its freedom from movable or adjustable parts, and its provision for simply yet reliable daylight control effected by a photosensitive device operationally responsive to the level of ambient illumination but operatively non-responsive to illumination of the device by any flashing light falling thereon or directly received thereby.

Other objects and advantages of the invention will appear as the detailed description thereof proceeds in the light of the drawings forming a part of this application, and in which.

Figure 1:
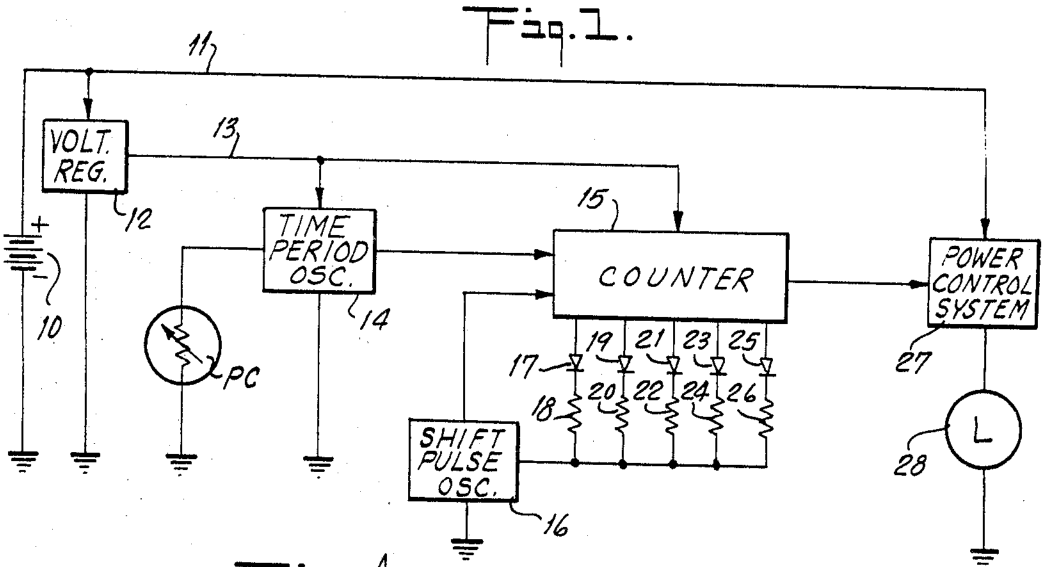
FIG. 1 is a block circuit diagram representing an electrical coded-pulse generator embodying the invention in a particular form.

Referring now more particularly to the block diagram system of FIG. 1, which represents the arrangement of an electrical coded-pulse generator embodying the present invention in a particular form, energization of the generator is supplied from a unindirectional power source such as a battery 10 having its negative terminal connected to ground and its positive terminal connected to a conductor 11. In certain applications such as marine navigational flashing light installations utilizing battery sources of energization, the battery output during service often deteriorates to such extent that it exhibits a relatively poor voltage regulation characteristic so that its terminal voltage varies appreciably with the load placed upon the battery. Accordingly, a voltage regulator unit 12 is preferably used to receive the voltage of the conductor 11 and supply a relatively constant amplitude voltage to an output circuit conductor 13 to insure more accurate and constant timing of a time period oscillator 14 and a multistage electronic counter 15 which are energized by the voltage of the conductor 13. As will presently be explained more fully, the generator generates patterns of electrical code pulses. In the form of the invention herein described by way of example, each such pulse pattern may include as many as three pulses separated by two interpulse intervals, and the pulses may have individually selectable pulse durations providing by way of example two initial pulses of equal duration and a third pulse of longer duration represenatative of the Morse letter "U" (dot-dot-dash). These patterns are repeated at successive equal time intervals established by the oscillator 14. The latter operates under control of an ambient light-sensitive device PC, such as a cadmium sulfide or like photo-resistive device, which senses the ambient light intensity and permits the supply of timing pulses to the counter 15 for ambient light intensities below a preselected level but abruptly terminates the supply of timing pulses for ambient light intensity in excess of the preselected level. The counter 15 is of the open-ring multistage type, comprising five stages in the embodiment herein described by way of example, and operates in conjunction with a shift pulse oscillator 16 and under control of the oscillator 14 to generate a succession of time intervals.

Briefly considered, a timing pulse from the oscillator 14 initiates the generation of a first time interval by the first stage of the counter 15 and this counter stage supplies a charging current through a diode rectifier 17 and a resistor 18 to a condenser of the oscillator 16. When the charge voltage of this condenser reaches a preselected value, the oscillator 16 supplies a shift pulse to the counter 15 which is effective to terminate the first time interval and initiate a second time interval by the second stage of the counter. The second stage thereupon supplies charging current through a diode rectifier 19 and a resistor 20 to charge the condenser of the oscillator 16, and the resulting shift pulse of the latter terminates the second time interval and initiates generation of a third time interval by the third stage of the counter 15. This stage likewise supplies charging current through a diode rectifier 21 and a resistor 22 to the condenser of the oscillator 16, and the resulting shift pulse terminates the third time interval and initiates generation of a fourth time interval by the fourth stage of the counter 15. A diode rectifier 23 and resistor 24 of this stage similarly causes a shift pulse to be generated by the oscillator 16 to terminate the fourth time interval and initiate a fifth time interval by the fifth stage of the counter 15. A diode rectifier 25 and a resistor 26 of this stage thereupon cause the oscillator 16 to generate a further shift pulse to terminate the fifth interval. The counter 15 thereafter remains quiescent until the operation just described is initiated by a further timing pulse supplied by the oscillator 14. The timing intervals generated by the stages of the counter 15 control a power control unit 27 to effect energization of a beacon lamp 28 from the energized circuit 11. In particular, certain of the timing intervals generated by the stages of the counter 15 are selected to generate voltage pulses having a pulse duration equal to the corresponding timing interval and the remaining time intervals provide interpulse spacing intervals. The power control unit 27 energizes the beacon lamp 28 each time it receives a voltage pulse from the counter 15, thus to provide a sequence of light flashes corresponding to the pattern of generated voltage pulses. It will be evident that the resultant pattern of light flashes is repeated at the periodicity of the timing pulses generated by the oscillator 14.

Figure 2:
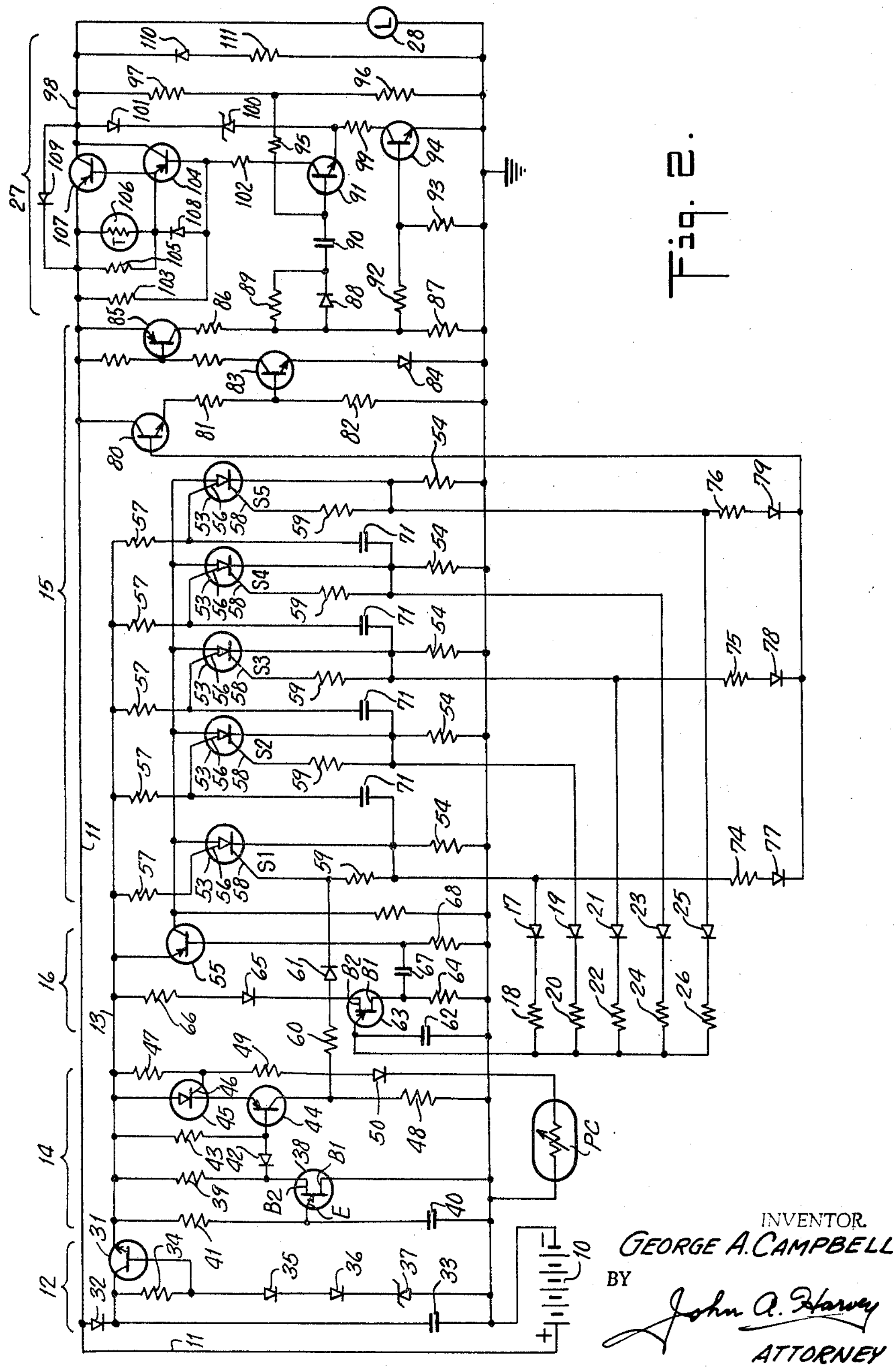
FIG. 2 is an electrical circuit diagram showing the detailed circuit arrangement of the FIG. 1 generator.

FIG. 2 is an electrical circuit diagram showing the detailed circuit arrangement of the generator just described in relation to FIG. 1.

The voltage regulator 12 is of the series regulator type and includes an NPN transistor 31 having its emitter electrode connected to the conductor 13 and its collector electrode coupled through an isolating diode rectifier 32 to the conductor 11 energized by the battery 10. The purpose of the isolating diode 32 is to isolate the regulator 12 from the battery whenever the terminal voltage of the latter may drop substantially during intervals of energization by the battery of the lamp 28 and by reason of a poor regulation characteristic of the battery. During intervals when the voltage regulator 12 is isolated by the diode 32 from the battery 10, energization is supplied to the voltage regulator by a condenser 33 which is maintained charged from the battery through the diode 32. The base electrode of the regulator transistor 31 is biased in conventional manner with a constant bias voltage supplied by a voltage divider comprised by a resistor 34, series diode rectifiers 35 and 36, and a Zener diode 37, connected across the condenser 33 as shown. The voltage regulator 12 operates in conventional manner to supply a substantially constant voltage to the oscillator 14, the counter 15, and the shift pulse oscillator 16 which are energized from the conductor 13.

The time period oscillator 14 is of the relaxation oscillator type and includes a unijunction transistor 38 having its base electrode B1 connected to ground, its base electrode B2 connected through a resistor 39 to the conductor 13, and its gate emitter electrode E connected to ground through a condenser 40 and connected to the conductor 13 through a resistor 41. This oscillator operates in conventional manner to generate across the base resistor 39 a constant periodicity electrical pulse signal of negative pulse polarity which identifies and establishes equal intervals at which the generation of the coded-pulse pattern of the generator is started. These generated pulses are supplied through a diode rectifier 42 to the base bias resistor 43 of a PNP transistor 44, the latter being essentially non-conductive in the intervals between pulses. The emitter electrode of the transistor 44 is energized from the conductor 13 through a low power silicon-control rectifier 45, which is normally rendered abruptly conductive concurrently with the transistor 44 by a potential supplied to its cathode gate conductivity-control electrode 46 from the conductor 13 through a resistor 47. In the normally conductive state of the silicon-control rectifier 45, the transistor 44 develops across an emitter load resistor 48 amplified timing pulses generated by the unijunction transistor 38. During periods of high ambient light illumination exceeding a preselected value, however, the photo-conductive device PC, connected between ground and the bias resistor 47 through a resistor 49 and a diode rectifier 50, produces across the bias resistor 47 a sufficiently large bias potential as to maintain the silicon-control rectifier 45 in a non-conductive state. This maintains the transistor 44 also non-conductive and the timing pulses generated by the unijunction transistor 38 are no longer developed across the emitter load resistor 48 until the ambient light intensity decreases below the preselected value. The photo-conductive device PC accordingly provides a daylight control which prevents, during periods of high ambient illumination, the transmission of timing pulses to the counter 15 as earlier described. An important characteristic of this daylight control, however, is that it cannot exert any control over the generation of a coded-pulse pattern once a timing pulse has been supplied to the counter 15 since the daylight control can only inhibit the translation of timing pulses which follow the one pulse. It will be apparent that this character of daylight control operation isolates the functioning of the daylight control from the light flashes of lamp 28 which may or may not fall upon the photo-conductive device PC and, in fact, no particular care need be taken to shield the photo-conductive device PC from such flashes so that the photo-conductive device may be positioned adjacent to the lamp 28 if desired.

The counter 15 includes a plurality of counter stages of any desired number according to the number of pulses to be generated in a coded-pulse pattern. Thus by way of example, the counter may include five stages S1–S5 as shown in FIG. 2 to generate a representative pulse-code pattern having a maximum of three code pulses separated by two interpulse intervals. These counter stages have the same constructions and each includes a conductance-control device comprised by a silicon-control switch transistor 53 having its cathode electrode connected through a load resistor 54 to ground and its anode connected through the emitter and collector electrodes of a control transistor 55 to the conductor 13, the anode gate electrode 56 of each being connected through a resistor 57 to the conductor 13 and the cathode gate electrode 58 of each being connected through a resistor 59 to the cathode of the switch transistor.

The timing pulses translated by the transistor 44 are supplied to the cathode gate electrode 58 of the silicon-control switch 53 of the counter stage S1 through a resistor 60 and a diode rectifier 61 and render the silicon-control gate of this stage conductive. The resultant potential developed across the cathode resistor 54 of this stage is supplied through the diode rectifier 17 and resistor 18 to charge a condenser 62 included in the shift pulse oscillator 16. The charge voltage of the condenser 62 is supplied to the emitter electrode of a unijunction transistor 63 included in the oscillator 16. The base electrode B1 of the transistor 63 is connected to ground through a resistor 64, and its base electrode B2 is connected to the conductor 13 through a diode rectifier 65 and a resistor 66. The charge voltage of the condenser 62 increases to a value at which the unijunction transistor 63 is abruptly rendered conductive by its emitter electrode to develope a voltage pulse across the base B1 load resistor 64. This voltage pulse terminates after a few microseconds when the emitter electrode of the transistor 63 discharges the condenser 62 through the resistor 64 to a sufficiently low value that the transistor 63 is no longer conductive. The shift pulse voltage thus developed across the resistor 64 is supplied through a condenser 67 to the base bias resistor 68 of the transistor 55 to render the latter non-conductive and thus remove energization from the anode of the silicon-control switch 53 of the counter stage S1. It will be evident that the period of conductivity of the silicon-control switch 54 of the counter stage S1 is established by the time required for the condenser 62 to reach the value required to render the unijunction transistor 63 conductive, and accordingly that this time interval is established by the time constant of the resistor 18 and condenser 62 functioning as a time-constant energy-storage RC network. While the silicon-control switch 53 of the counter stage S1 is conductive, a condenser 71 intercoupling the cathode of the silicon-control switch 53 of the stage S1 and the gate control electrode 56 of the silicon-control switch 53 of the counter stage S2 is charged to a voltage corresponding to that of the conductor 13 less the voltage drop developed across the resistor 54.

This charge voltage of the condenser 71 is sufficient to render conductive the silicon-control switch 53 of the counter stage S2 as soon as the control transistor 55 is once again rendered conductive at the end of the shift voltage pulse developed across the bias resistor 68 by the unijunction transistor 63. The resultant voltage drop developed across the load resistor 54 of the counter stage S2 likewise charges the condenser 62 of the phase shift oscillator 16 through the diode rectifier 19 and resistor 20 once again cause the unijunction transistor 63 to develop a shift pulse across the bias resistor 68 and thereby render the silicon-control switch 53 of the counter stage S2 nonconductive. The interval of conductivity of the stage S2 is likewise established by the time constant of the resistor 20, individual to the stage S2, and the condenser 62 of the oscillator 16.

When the control transistor 55 again becomes conductive at the termination of this shift pulse, the silicon-control rectifier 53 of the counter stage S3 becomes conductive for an interval established by the time constant of the resistor 22, individual thereto, and the condenser 62. It will be evident that the next generated shift pulse developed across the bias resistor 68 transfers conductivity to the silicon-control switch 53 of the counter stage S4 for an interval established by the time constant of the resistor 24, individual to this stage, and the condenser 62. In similar manner, the following shift pulse transfer conductivity from the silicon-control switch 53 of the counter stage S4 to that of the counter stage S5 which remains conductive for a time interval established by the time constant of its resistor 26 and the condenser 62. It will be evident that the next generated shift pulse developed across the bias resistor 68 transfers conductivity to the silicon-control switch 53 of the counter stage S4 for an interval established by the time constant of the resistor 24, individual to this stage, and the condenser 62. In similar manner, the following shift pulse transfers conductivity from the silicon-control switch 53 of the counter stage S4 to that of the counter stage S5 which remains conductive for a time interval established by the time constant of its resistor 26 and the condenser 62. The next shift pulse developed across the bias resistor 68 terminates conductivity of the silicon-control switch 53 of the counter Stage S5, and the counter thereafter remains quiescent awaiting a further timing pulse from the timing oscillator 14.

Such further timing pulse initiates repetition of the cycle of counter operation just described, during which cycle the electrical energy-storage condensers 71 in coupling the output-circuit resistor 54 of one counter stage to the conductance-control anode gate electrode 56 of the silicon-control switch 53 of the next counter stage renders the silicon-control switches conductive successively in order from the counter stage S1 to the counter stage S5. It will be evident that this operation of the counter stages one after another in succession occurs at the intervals of the shift pulses developed across the bias resistor 68, and that the time intervals between successive shift pulses are selectable over wide ranges according to the values selected for the time-constant energy storage network condenser 62 common to all stages and the resistors 18, 20, 22, 24 and 26 individual to the stages.

As the counter 15 progresses through a cycle of operation in the manner just described, the potential pulses developed across the output-circuit load resistor 54 of the first and alternate counter stages S1, S3 and S5 are translated through respective resistors 74, 75 and 76 and respective diode rectifiers 77, 78 and 79 to the base electrode of an NPN transistor 80 having series-connected emitter load resistors 81 and 82. The amplified pulses developed across the emitter load resistor 82 are translated through a conventional transistor amplifier stage, which includes an NPN transistor 83 with emitter diode rectifier 84, to a second conventional transistor amplifier stage which includes a PNP transistor 85 having series-connected collector load resistors 86 and 87.

The translated voltage pulses developed across the collector load resistor 87 are applied to the power control unit 27. In particular, these voltage pulses are supplied through a parallel-connected diode rectifier 88 and resistor 89 and through a condenser 90 to the base electrode of an NPN transistor 91, and are also supplied through a resistive potential divider comprised by resistors 92 and 93 to the base electrode of an NPN transistor 94. The base electrode of the transistor 91 is biased through a resistor 95 from a potential divider comprised by series resistors 96 and 97 connected between ground and an energizing circuit conductor 98 of the lamp 28. The transistor 94 with its collector load resistor 99 is energized at substantially constant voltage through a Zener diode 100 and a diode rectifier 101 from the energizing circuit 98 of the lamp 28, and comprises an emitter bias impedance for the transistor 91. The latter includes series-connected collector load resistors 102 and 103, and controls the base biasing of a PNP transistor 104 having an emitter load resistor 105 shunted by a temperature stabilizing thermistor 106. The transistor 104 controls the base bias of a series regulator transistor 107 having emitter and collector electrodes connecting the battery energized conductor 11 and the energizing circuit conductor 98 of the lamp 28. The transistor 91 is responding to the voltage of the energizing circuit conductor 98 and to the counter voltage pulses translated by the transistor amplifier stages 85 and 94 so controls the series regulator transistor 107 through the transistor 104 as to effect energization of the lamp energizing circuit conductor 98 in response to each voltage pulse translated by the transistor amplifier stage 85 and with an essentially constant value of energizing voltage supplied to the lamp 28. The voltage regulating arrangement just described effects such control over the regulator transistor 107 as to maintain the latter essentially non-conductive (i.e. turned "off") in the event that an electrical short circuit occurs in the lamp 28 or its energizing circuit conductor 98. Thus if the lamp terminals are shorted, the base bias voltage supplied to the transistor 91 from the potential-divider output voltage sensing network 96 and 97 is essentially zero. Similarly the emitter bias voltage of the transistor 91 is also essentially zero since the output voltage of the energizing circuit conductor 98 is too low to render the Zener diode 100 conductive. Under these conditions, the transistor 91 cannot remain "on." It will merely try to turn "on" and regain control of energization of the output circuit conductor 98 each time that a voltage pulse is received from the transistor 85, but will immediately turn "off" as soon as the charge of the condenser 90 has been dissipated. This condition exists until such time as the electrical short in the lamp 28 or of its energizing circuit conductor 98 is removed or corrected. Energization of the circuit 98 is thereafter resumed by regenerative emitter pulsing of the transistor 91 by action of the condenser 90 and transistor 94 upon the next pulse developed by the transistor 85 across its collector load resistor 87. Surge protection of the current regulator transistor 107 is provided conventionally by a diode rectifier 109, and further protection of the transistor 107 against inductive voltage surges in the lamp energizing circuit conductor 98 is provided by a series-connected diode rectifier 110 and resistor 111 which are connected in shunt to the lamp energizing circuit. The diode rectifier 109 also protects the transistor 107 and its drive circuit in the event that the polarity of the input supply voltage (i.e. the battery 10) is reversed. If this happens, the lamp is simply energized through the rectifier 109 and the reverse voltage applied across the emitter and collector electrodes of the regulator transistor 107 is limited to a value of approximately one volt.

In summary of the operation of the coded-pulse generator just described, a constant periodicity pulse pattern timing signal is generated by the unijunction transistor oscillator 38 of the unit 14. For ambient light intensities below a preselected value controlled by the photo-conductive device PC, each pulse of this signal is supplied to the first stage S1 of the counter 15. This counter stage thereupon initiates, by operation of the unijunction transistor 63, the generation of a series of shift pulses which cause the counter stages to be successively rendered operative in order from the counter stage S1 to the counter stage S5. Each counter stage is operative for an interval of time individually established by its associated resistor 18, 20, 22, 24 and 26 through which the common condenser 62 is charged, so that the intervals of successive operations of the counter stages may be individually selected to have any desired value so long as the total of the operative time intervals does not exceed the period of the timing pulses generated by the unijunction transistor 38. The output voltage pulses developed by the first and any alternate ones of the counter stages selected according to a desired coded-pulse pattern, with selectable values of interpulse intervals provided by the intervening counter stage, are supplied to the control unit 27 which operates to supply a corresponding coded-pulse pattern of energizing current pulses to the lamp 28 to create a corresponding flash light code pattern suitable for marine or other like navigational applications. The timing of these light flashes is relatively independent of the regulation characteristic of the energizing battery 10, and the code-pulse generator operates with high operational reliability and effeciency as is particularly desirable in those applications utilizing an energizing battery. The random sequence of light flashes, the duration of each flash, and the intervals between any pair of successive flashes may be readily selected and changed as desired by simple change or adjustment of the values of the counter resistors 18, 20, 22, 24 and 26 in relation to the size of the relaxation-oscillator condenser 62. The generator operates with minimized power requirements since significant power is drawn from the battery only during the interval of each light flash and is relatively insignificant during the interval between light flashes and during daylight hours of moderate ambient light intensity.

Figures 3, 4:
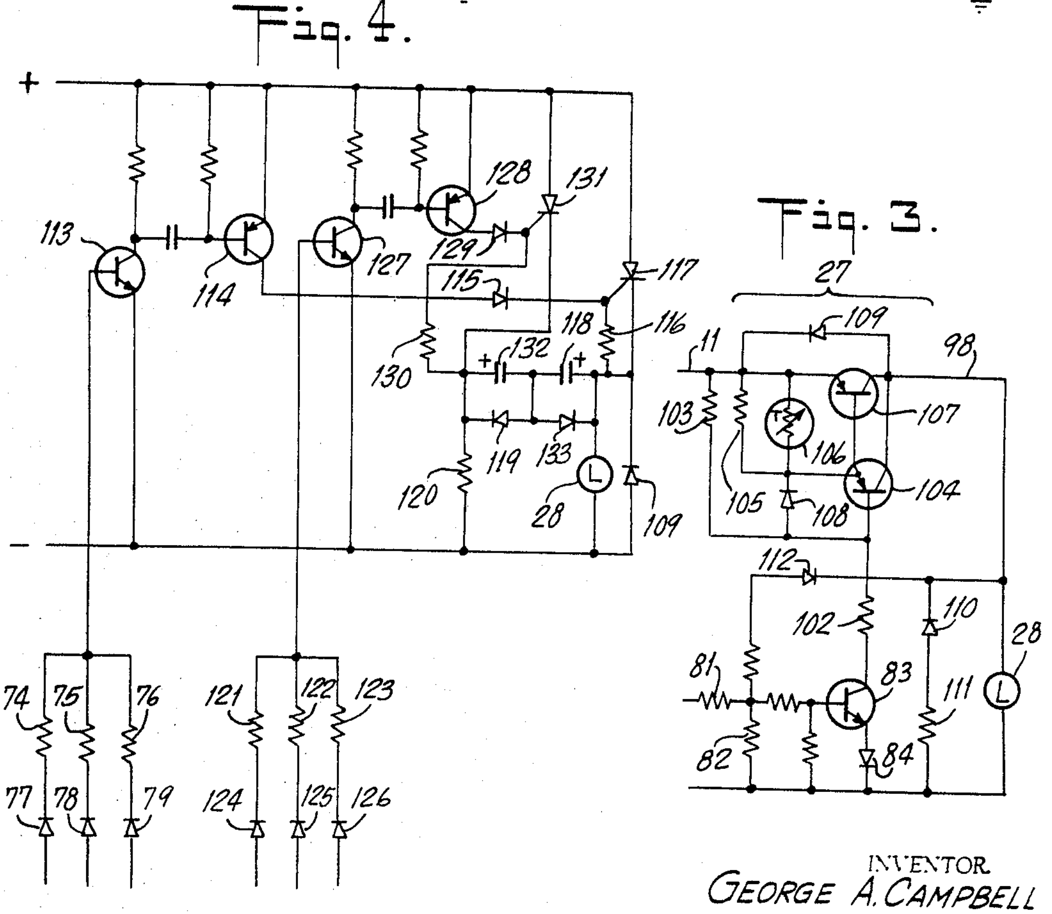
FIGS. 3 and 4 are electrical circuit diagrams showing power control systems used in modified forms of an electrical coded-pulse generator embodying the invention.

FIG. 3 is a circuit diagram of a non-regulated power control system 27 suitable for use in an electrical coded-pulse generator embodying the invention in modified form. Components in FIG. 3 which correspond to similar components in FIG. 2 are identified by similar reference numerals. In the present control system, the transistor amplifier stage which includes the NPN transistor 83 directly drives, without current regulation control, the power transistor 107 through the transistor 104 so that each voltage pulse translated by the transistor 83 causes the transistor 107 to energize the lamp 28 by energization of the lamp energizing circuit conductor 98 from the battery energized conductor 11. A diode rectifier 112 provides protection for the power transistor 107 in the event that the lamp 28 or its energizing circuit 98 should develop a short circuit. Aside from the non-regulated character of operation of this power control unit, its operation is otherwise essentially similar to that of the power control unit 27 previously described in relation to FIG. 2.

A further modified form of power control system suitable for use with the coded-pulse generator of the invention is shown in the electrical circuit diagram of FIG. 4. In this present power control system, the output voltage pulses of the first and alternate stages of the counter 15 described in relation to FIG. 2 are supplied through the resistors 74–76 and the diode rectifiers 77–79 to a conventional transistor amplifier stage which includes an NPN transistor 113. The voltage pulses amplified by this amplifier stage are supplied for further amplification to the base electrode of a PNP transistor 114 having a collector load impedance comprised by a diode rectifier 115, a resistor 116, and the filament of the lamp 28. The collector load resistor 116 is connected between the cathode gate electrode and cathode of a silicon-control rectifier 117, and amplified counter output voltage pulses cause the silicon-control rectifier 117 to become conductive and energize the lamp 28 from the battery energized conductor 11. During the conductive state of the silicon-control rectifier 117, the voltage developed across the lamp 28 causes a condenser 118 to be charged through a diode rectifier 119 and a resistor 120.

In this modified form of power control system, output voltage pulses developed across the resistors 54 of the second and fourth stages, and a further sixth stage additional to those shown in FIG. 2, are supplied through respective resistors 121–123 and respective diode rectifiers 124–126 to a conventional transistor amplifier stage which includes an NPN transistor 127. The amplifier voltage pulse are supplied to a further transistor amplifier stage which includes a PNP transistor 128 having a collector load impedance comprised by a diode rectifier 129, a resistor 130, and the resistor 120. The resistor 130 is connected between the cathode gate electrode and cathode of a silicon-control rectifier 131, and the amplified voltage pulses developed across the load resistor 130 cause the silicon-control rectifier 131 to become conductive and develop a voltage drop across the resistor 120. The voltage drop charges a condenser 132 which is connected in series with the condenser 118 as shown. The charge voltage of the latter maintains a diode rectifier 133, connected in shunt thereto, non-conductive until the condenser 118 has discharged. The discharge current of the condenser 118 develops across the lamp 28 a voltage of such amplitude and polarity as to render the silicon-control rectifier 117 non-conductive and thus extinguish the lamp 28. The value of the resistor 120 is preferably selected sufficiently large that the current flowing through the silicon-control rectifier 131 in its conductive state is somewhat below the value which will maintain the latter conductive. Therefore, the silicon-control rectifier 131 becomes non-conductive a few milliseconds after the termination of each voltage pulse developed across the resistor 130. The silicon-control rectifier 131 remains conductive, however, for a sufficiently long interval to effect discharge of the condenser 118 to render the silicon-control rectifier 117 non-conductive as last described.

When the silicon-control rectifier 117 is next rendered conductive by an amplified voltage pulse translated through the transistors 113 and 114, the resultant voltage drop developed across the lamp 28 by energization thereof charges the condenser 118. Since the diode 119 is maintained non-conductive by the charge potential of the condenser 132, the condenser 132 is thereupon discharged to develop across the resistor 120 a voltage pulse of such amplitude and polarity as to render the silicon-control rectifier 131 non-conductive if it should have remained conductive after the last voltage pulse developed across the resistor 130.

Thus successive counter output pulses translated by the transistors 113 and 114 of the FIG. 4 control system cause the silicon-control rectifier 117 to become conductive and energize the lamp 28 while concurrently rendering the silicon-control rectifier 131 non-conductive, and counter output voltage pulses translated by the transistors 127 and 128 cause the silicon-control rectifier 131 to become conductive and thereby extinguish the lamp 28 by rendering the silicon-control rectifier 117 non-conductive.

While there have been described specific forms of the invention for purposes of illustration, it is contemplated that numerous changes may be made without departing from the spirit of the invention.

What is claimed is:

1. An electrical coded-pulse generator for marine signals comprising means for generating an electrical signal identifying repetitive time intervals, a multistage electronic counter including conductance-control devices and means electrically intercoupling said devices to render said devices successively conductive in order from a first to a last thereof, signal translating means controlled by said signal at the outset of each of said repetitive time intervals identified thereby for initiating conductivity of the first of said devices in said order thereof, electrical timing means responsive to the conductive state of each of said devices and including time-interval control means individual to said each device for terminating the conductivity of said each device after a preselected time interval individual thereto, an electrical load device, and means responsive to the conductive states of said devices for energizing said load device with an electrical pulse signal having successive pulses with individual pulse durations individually controlled by the conductive state of individual alternate ones of said devices in said order thereof and individual inter-pulse intervals individually controlled by the conductive state of individual intervening ones of said devices in said order thereof.

2. An electrical coded-pulse generator according to claim 1 wherein said time-interval signal generating means comprises a pulse signal generator for generating a constant periodicity electrical pulse signal having a pulse periodicity identifying equal time intervals.

3. An electrical coded-pulse generator according to claim 2 wherein said electrical load device comprises a beacon light, wherein said signal translating means comprises a repeater for said constant periodicity pulse signal and includes an electrical control device abruptly rendered conductive to permit translation of each pulse of said electrical pulse signal by said repeater, and wherein an ambient light responsive means controls said electrical control device to permit and prevent initiation of conductivity thereby for ambient light intensities respectively less than and in excess of a preselected value.

4. An electrical coded-pulse generator according to claim 3 wherein said electrical control device is comprised by a silicon-control rectifier having a gate conductivity-control electrode, and wherein said light responsive means comprises a photo-resistive device electrically coupled to said gate electrode to control the electrical operational bias thereof.

5. An electrical coded-pulse generator according to claim 1 wherein said counter conductance-control devices are comprised by silicon-control switch transistors each having a gate conductance-control electrode and having conductance electrodes included in an output circuit of said each silicon-control switch transistor, wherein said electrical intercoupling means includes electrical energy storage devices individually coupling the output circuit of each silicon-control switch transistor to the gate conductance-control electrode of the next silicon-control switch transistor in said order thereof, and wherein said electrical timing means concurrently controls the conductive-state energization of all of said silicon-control switch transistors to effect said termination of the conductivity of each thereof.

6. An electrical coded-pulse generator according to claim 5 wherein said output circuit of each of said silicon-control switch transistors includes an output-circuit load impedance and said electrical energy storage devices comprise condensers individually coupling said output-circuit load impedance of said silicon-control switch transistors to the gate conductance-control electrode of the next silicon-control switch transistor in said order thereof.

7. An electrical coded-pulse generator according to claim 1 wherein said electrical timing means includes a time-constant energy-storage network including an energy-storage network component common to all of said conductance-control devices and a network-control component individual to each of said conductance-control devices.

8. An electrical coded-pulse generator according to claim 6 wherein said electrical timing means includes time-constant energy-storage networks including an energy-storage condenser common to all thereof and a network storage-control resistor individual to each of said silicon-control switch transistors and coupling said output-circuit load impedance thereof to said energy-storage condenser for charging said condenser during the conductive state of said each silicon-control switch transistor.

9. An electrical coded-pulse generator according to claim 8 wherein said electrical timing means includes an electrical energization control device having an abrupt-conductivity control electrode responsive to attainment of a preselected charge in said condenser for rendering said energization control device abruptly conductive to discharge said condenser and terminate conductivity of said energiztaion control device, and wherein said electrical timing means further includes means controlled by the conductive state of said energization control device for concurrently terminating conductive energization of all of said silicon-control switch transistors.

10. An electrical coded-pulse generator according to claim 9 wherein said energization control device comprises a unijunction transistor having an abrupt-conductivity control gate electrode.

11. An electrical coded-pulse generator according to claim 10 wherein said means for concurrently terminating conductive energizaton of said silicon-control switch transistors comprises an energization control transistor having emitter and collector electrodes through which energization is supplied to all of said silicon-control switch transistors and having a base electrode coupled to said unijunction transistor to terminate conductivity of said energization control transistor by the conductive state of said unijunction transistor.

12. An electrical coded-pulse generator according to claim 3 wherein said counter conductance-control devices are comprised by silicon-control switch transistors each having a gate conductance-control electrode and having conductance electrodes included in an output circuit of said each silicon-control switch transistor, wherein said electrical intercoupling means includes electrical energy storage devices individually coupling the output circuit of each silicon-control switch transistor to the gate conductance-control electrode of the next silicon-control switch transistor in said order thereof, and wherein said electrical timing means concurrently controls the conductive-state energization of all of said silicon-control switch transistors to effect said termination of the conductivity of each thereof.

13. An electrical coded-pulse generator according to claim 12 wherein said electrical control device is comprised by a silicon-control rectifier having a gate conductivity-control electrode, and wherein said light responsive means comprises a photo-resistive device electrically coupled to said gate electrode to control the electrical operational bias thereof.

14. An electrical coded-pulse generator according to claim 4 wherein an output circuit of each of said conductance-control devices includes an output-circuit load impedance and wherein said electrical intercoupling means comprise condensers individually coupling said output-circuit load impedance of each of said conductance-control devices to the gate conductance-control electrode of the next conductance-control device in said order thereof.

15. An electrical coded-pulse generator according to claim 14 wherein said electrical timing means includes a time-constant energy-storage network including an energy-storage network component common to all of said conductance-control devices and a network-control component individual to each of said conductance-control devices.

16. An electrical coded-pulse generator according to claim 3 wherein said electrical timing means includes time-constant energy-storage networks including an energy-storage condenser common to all thereof and a network storage-control resistor individual to each of said conductance-control devices and coupling said output-circuit load impedance thereof to said energy-storage condenser for charging said condenser during the conductive state of said each conductance-control device.

17. An electrical coded-pulse generator according to claim 16 wherein said electrical timing means includes an electrical energization control device having an abrupt-conductivity control electrode responsive to attainment of a preselected charge in said condenser for rendering said energization control device abruptly conductive to discharge said condenser and terminate conductivity of said energization control device, and wherein said electrical timing means further includes means controlled by the conductive state of said energization control device for concurrently terminating conductive energization of all of said conductance-control devices.

18. An electrical coded-pulse generator according to claim 17 wherein said energization control device comprises a unijunction transistor having an abrupt-conductivity control gate electrode.

19. An electrical coded-pulse generator according to claim 18 wherein said means for concurrently terminating conductive energization of said conductance-control devices comprises an energization control transistor having emitter and collector electrodes through which energization is supplied to all of said conductance-control devices and having a base electrode coupled to said unijunction transistor to terminate conductivity of said energization control transistor by the conductive state of said unijunction transistor.

20. An electrical coded-pulse generator according to claim 19 wherein said electrical control device is comprised by a silicon-control rectifier having a gate conductivity-control electrode, and wherein said light responsive means comprises a photo-resistive device electrically coupled to said gate electrode to control the electrical operational bias thereof.

21. An electrical coded-pulse generator according to claim 1 wherein said means for energizing said load device comprises: (a) a first silicon-control rectifier device supplying energizing current to said load device and a second silicon-control rectifier device supplying energization current to a load resistor, (b) means intercoupling said load device and said load resistor to alternate the conductive states of said rectifier devices, and (c) means responsive to the conductive states of the first and successively alternate ones of said counter conductance-control devices in said order thereof for rendering said first silicon-control rectifier device conductive and responsive to the conductive states of the second and successively intervening ones of said counter conductance-control devices in said order thereof for rendering said second silicon control rectifier device conductive.

References Cited

UNITED STATES PATENTS

| | | | |
|---|---|---|---|
| 3,284,721 | 11/1966 | Carlson | 331—66 |
| 3,311,842 | 3/1967 | Beck | 331—66 |
| 3,414,739 | 12/1968 | Paidosh | 307—271 |

ROBERT K. SCHAEFER, Primary Examiner

H. J. HOHAUSER, Assistant Examiner

U.S. Cl. X.R.

331—66; 340—167